United States Patent [19]

Corfitsen

[11] Patent Number: 5,393,195
[45] Date of Patent: Feb. 28, 1995

[54] METHOD AND ARRANGEMENT FOR AUTOMATICALLY REFUELING AUTOMOTIVE VEHICLES

[76] Inventor: Sten Corfitsen, Krokusvägen 17, S-181 31 Lidingö, Sweden

[21] Appl. No.: 940,862
[22] PCT Filed: Apr. 30, 1991
[86] PCT No.: PCT/SE91/00312
  § 371 Date: Oct. 30, 1992
  § 102(e) Date: Oct. 30, 1992
[87] PCT Pub. No.: WO91/17111
  PCT Pub. Date: Nov. 14, 1991

[30] Foreign Application Priority Data
  May 2, 1990 [SE] Sweden .............................. 9001575-1

[51] Int. Cl.⁶ .............................................. B25J 15/06
[52] U.S. Cl. .................................... 414/749; 414/684.3; 414/736; 414/752; 901/39; 901/40; 294/2; 141/98; 141/DIG. 1
[58] Field of Search .................... 414/684.3, 749, 736, 414/751, 753, 786, 737; 901/7, 39, 40; 296/97.22; 141/98, DIG. 1; 294/2, 3, 64.1, 65.5

[56] References Cited

U.S. PATENT DOCUMENTS

| | | | |
|---|---|---|---|
| 2,706,564 | 4/1955 | Peters | 414/684.3 |
| 3,527,268 | 9/1970 | Ginsburgh | 141/98 |
| 4,743,159 | 5/1988 | Inamori | 414/737 |
| 4,917,418 | 4/1990 | Gokee | 296/97.22 X |
| 4,946,336 | 8/1990 | Larsson | 414/684.3 X |
| 4,988,260 | 1/1991 | Kiba et al. | 901/7 X |
| 5,082,418 | 1/1992 | Poux et al. | 901/40 X |
| 5,238,034 | 8/1993 | Corfitsen | 141/94 |

FOREIGN PATENT DOCUMENTS

| | | |
|---|---|---|
| 0265829 | 5/1988 | European Pat. Off. . |
| 2929192 | 3/1983 | Germany . |
| 9013512 | 11/1990 | WIPO . |

*Primary Examiner*—Donald W. Underwood
*Attorney, Agent, or Firm*—Nies, Kurz, Bergert & Tamburro

[57] ABSTRACT

A method and apparatus for opening and closing a cover-plate on an automotive vehicle, wherein the plate lies in line with the vehicle outer body panel and can be swung between an open and a closed position about a vertical or horizontal hinge axis and covers the space in which the mouth of the vehicle refuelling pipe is located. The cover-plate is opened in two stages, wherein the plate is opened slightly to a limited open position by a first opening device in a first opening stage, thereby enabling a second opening device to be inserted between the cover-plate and the outer body panel, and wherein the plate is opened completely by the second opening device in a second opening stage. The cover plate is swung from its open to its closed position by the second opening device.

9 Claims, 3 Drawing Sheets

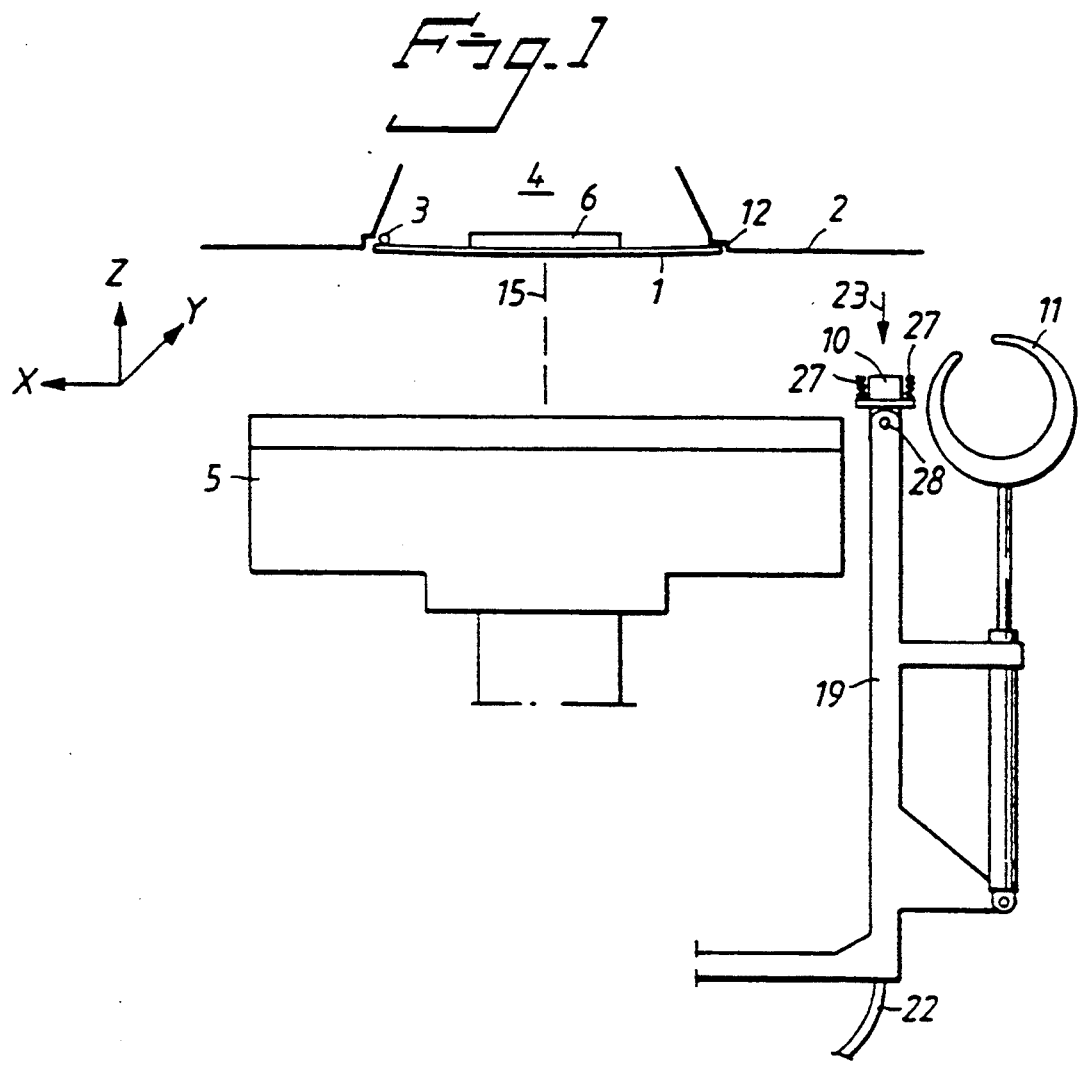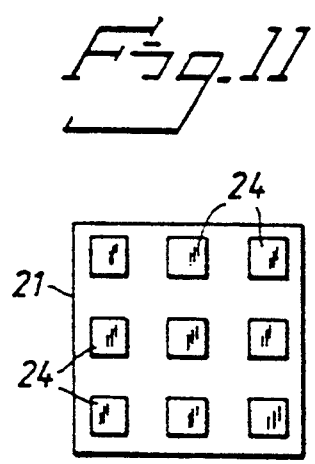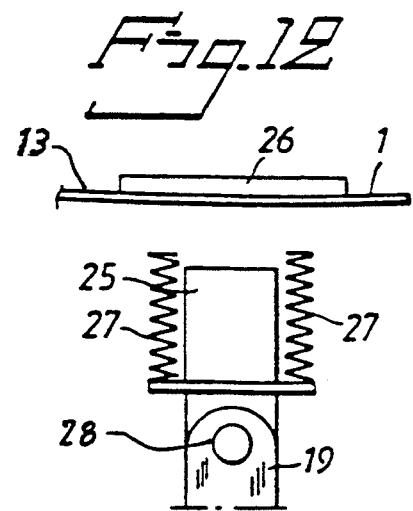

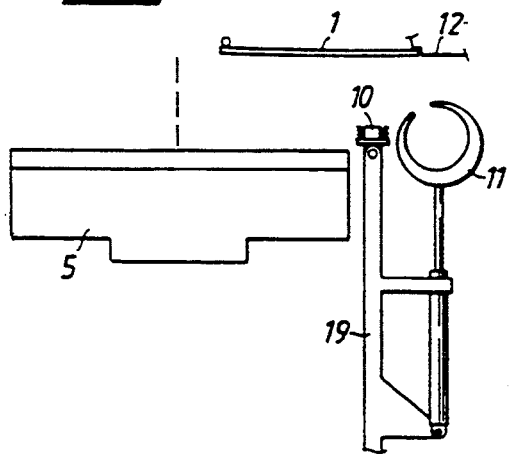
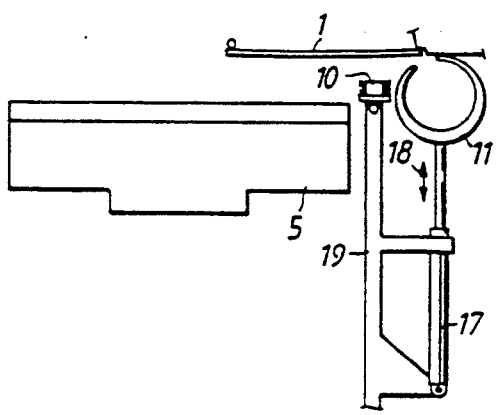
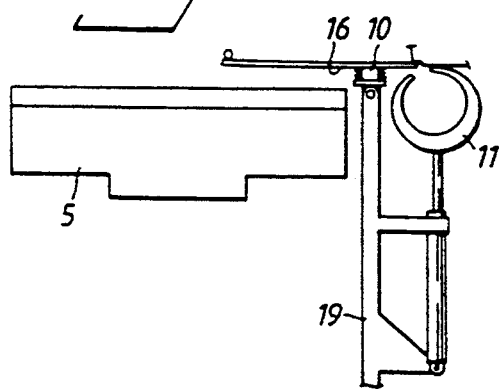
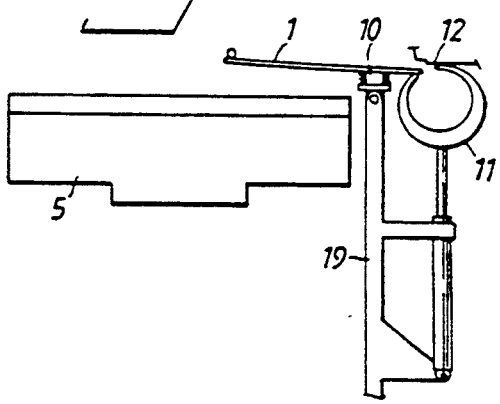
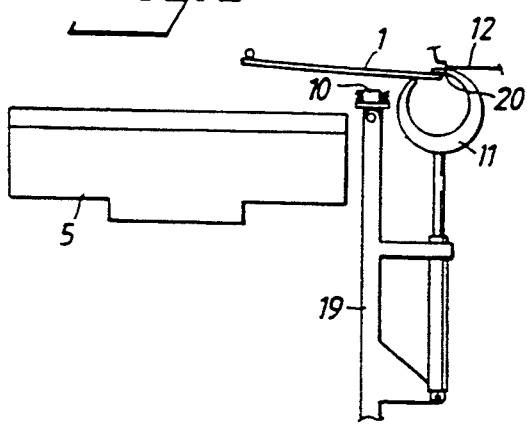
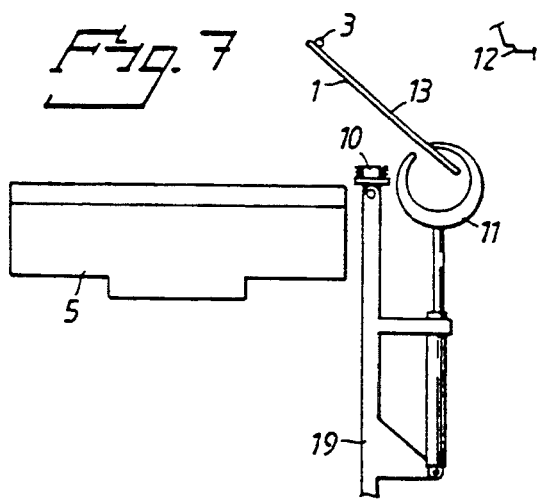

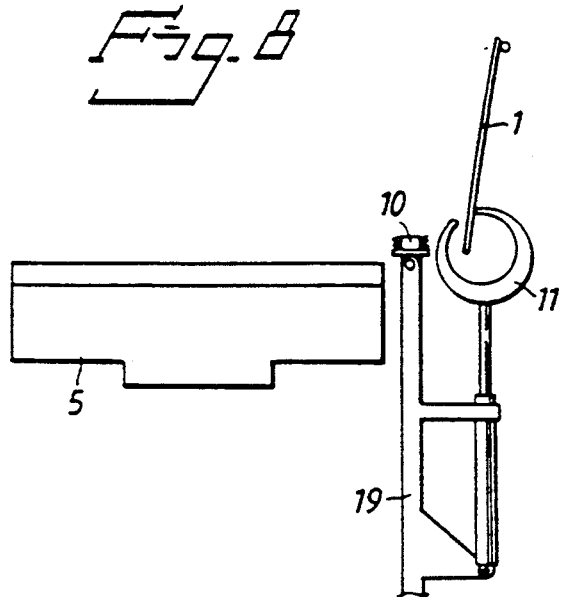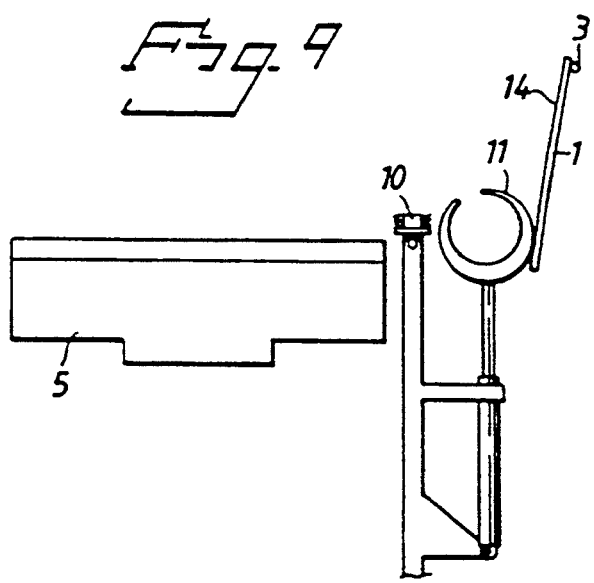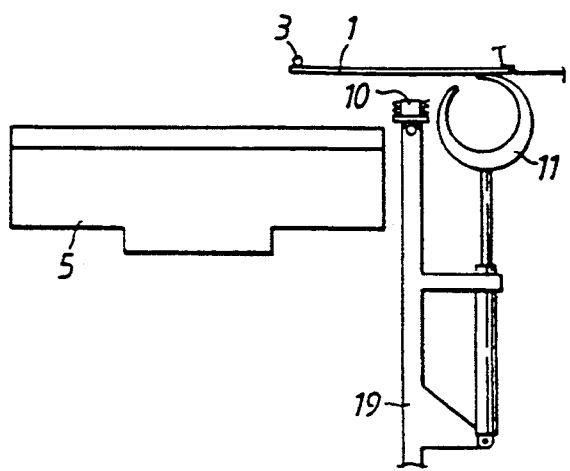

METHOD AND ARRANGEMENT FOR AUTOMATICALLY REFUELING AUTOMOTIVE VEHICLES

BACKGROUND OF THE INVENTION

1. Field of the Invention

The present invention relates to an arrangement for automatically refuelling cars or other automotive vehicles.

2. Description of the Related Art

An arrangement for automatically refuelling cars is described in Swedish Patent Application 8901674-5 (U.S. Pat. No. 5,238,034).

This known arrangement comprises a robot which includes a refuelling pistol or corresponding device. The arrangement also includes a sensing and control device which functions to move the refuelling pistol automatically from a rest position to the vehicle refuelling location, subsequent to the vehicle having been manouvered into a predetermined position relative to the robot. The refuelling pistol includes a rigid, first tubular element or pipe which is moved by the robot towards a receiving plate provided with an aperture incorporated in the vehicle refuelling location. A flexible, second pipe is displaceably mounted within the first, rigid pipe and can be moved from a first end position, in which the outer free end of the second pipe is located within the first pipe, to a second end position in which the second pipe projects out from the first pipe. A pipe connection is provided between said aperture and the tank-located vehicle refuelling pipe or tube. The robot is constructed to move the refuelling pipe out of the free end of the second pipe and down into the pipe connection or down into the vehicle refuelling pipe, and fuel is pumped through the second pipe down into the vehicle tank.

One problem with this arrangement, however, is that it is necessary to equip the cars with a special adapter having a cap which can be opened by the robot head in order to establish communication between the head and the vehicle refuelling pipe.

An advantage would be afforded if it were possible, instead, to retain the original petrol-cap cover plate of the car, i.e. the plate mounted on the car chassis and covering the space in which the petrol cap is located. In this case, a petrol cap constructed in accordance with the aforesaid patent specification would be required inwardly of the cover plate, in order to guide the flexible members of the robot head into the vehicle refuelling pipe. The problem remains, however, of constructing the robot so that it is capable of opening and closing the cover plates of different car models.

The problem primarily consists in the fact that many different designs of car cover plates are found. The majority of mode cars, however, are equipped with a cover plate which lies in line with the surrounding outer body panel and which can be swung between a closed and an open position about a vertical axis. Normally, a recess is provided in the outer body panel or an outwardly curved surface is provided on the cover plate, so that a finger can be readily inserted between the plate and the outer body panel with the intention of opening the plate. The design, however, differs widely from car to car.

SUMMARY OF THE INVENTION

The aforesaid problems are solved by means of the present invention, which provides a method and an arrangement for opening the cover plate with the aid of a robot, despite the various plate designs on different makes of vehicle.

The present invention thus relates to a method for opening and closing a vehicle petrol-cap cover plate which lies in the line of the vehicle outer body panel and which can be swung between an open and a closed position about a vertical or horizontal hinge axis and which covers the space in which the mouth of the vehicle refuelling pipe is located, said method being characterized by opening the cover plate in two stages, where in a first opening stage the flap is opened slightly to a limited open position by means of a first opening device, such as to enable a second opening device to be inserted between the plate and the outer body panel, wherein in a second opening stage said plate is opened completely by means of said second opening device; and by causing the plate to swing from its open to its closed position, by means of said second opening device.

The invention also relates to an arrangement of the kind having a first opening device provided for opening the cover-plate slightly to a limited open position in a first opening stage, and a second opening device for insertion between the cover-plate and the outer body panel with the cover-plate in its limited open position. The second opening device is intended to open the plate completely in a second opening stage by effecting a lateral movement while the second opening device is in abutment with the rear side of the cover-plate. The second opening device also swings the cover-plate from its open position to its closed position by executing a lateral movement while the second opening device is in abutment with the outside of the cover-plate.

BRIEF DESCRIPTION OF THE DRAWINGS

The invention will now be described in more detail with reference to the accompanying drawings, in which FIG. 1 illustrates part of a vehicle provided with a petrol-cap cover plate and further illustrates part of a robot head and an opening arrangement in accordance with the present invention;

FIGS. 2-8 illustrate a cover plate opening sequence;

FIGS. 9 and 10 illustrate a cover plate closing sequence;

FIG. 11 illustrates a suction cup;

FIG. 12 illustrates an alternative embodiment of a first cover plate opening device.

DESCRIPTION OF THE PREFERRED EMBODIMENTS

FIG. 1 illustrates an arrangement constructed in accordance with the invention. The arrangement is intended to open and close a petrol-cap cover plate 1 provided on a vehicle 2. The plate 1 lies in the line of the vehicle outer body panel and can be swung between an open and a closed position about a vertical or horizontal hinge axis 3. The plate covers the space 4 in which the mouth of the vehicle refuelling pipe (not shown) is located, in a known manner.

FIG. 1 also illustrates a robot head 5 which includes position sensing means for sensing or detecting the position of the robot head relative to a transponder 6 positioned behind or in the cover plate, or positioned at some other location. The robot head also includes fuel pipes. The robot head may be constructed appropriately in accordance with U.S. Pat. No. 5,238,024.

However, a positioning system other than that described in the aforesaid patent specification can be used. For example, an optical system can be used.

The inventive arrangement includes a first cover-plate opening device 10 which is intended to open the plate 1 slightly in a first opening stage, to a limited open position, illustrated in FIG. 5. The arrangement also includes a second cover-plate opening device 11 which is intended for insertion between the cover-plate 1 and the outer body panel 12 when the plate 1 occupies its limited open position, see FIG. 6. The second opening device 11 is intended to open the cover-plate 1 completely in a second stage, by executing a lateral movement with said second opening device 11 in abutment with the rear side 13 of the cover-plate 1, see FIGS. 7 and 8.

The second opening device 11 is also intended to swing the cover-plate 1 from its open to its closed position, by executing a lateral movement with the second opening device in abutment with the outside 14 of the cover-plate 1, see FIGS. 9 and 10.

According to one preferred embodiment of the inventive arrangement, the two opening devices are attached to a body 19, which in turn is attached to the robot head. In this way, all movements are effected by movement of the robot head. Alternatively, the inventive arrangement may be such as to enable the body 19 to be moved through the intermediary of separate movable devices.

As beforementioned, the inventive arrangement operates to open the cover-plate 1 in two stages, wherein the plate 1 is opened slightly to a limited open position in a first stage, see FIG. 5, by means of the first opening device 10, such as to enable the second opening device 11 to be inserted between the cover-plate 1 and the outer body panel 12. In a second opening stage, the plate 1 is opened completely by means of the second opening device 11. The cover-plate 1 is swung from its open position to its closed position by means of the second opening device 11.

When the refuelling robot is used to refuel a car, the robot head is moved forwards against said transponder 6, as described in the aforesaid U.S. patent specification. This is illustrated in FIG. 1, which shows the robot head 5 moved forwards in the Y-direction, along the broken line 15. Subsequent to the robot head being located in a predetermined position relative to the transponder 6, the robot head is moved slightly in the X-direction, see FIG. 2, whereafter said head is moved in the Z-direction, towards the cover plate 1, see FIGS. 3 and 4, such that in the first opening stage the first opening device 10 is brought into abutment with the cover plate 1 in a region 16 which is opposite the edge along which the cover plate is hinged in relation to the outer body panel 12. The second opening device is mounted resiliently by means of a spring 17, so that said device is able to spring in the direction of the arrow 18 relative to the body 19 of said arrangement, see FIG. 3.

When the first opening device 10 is in abutment with the cover-plate 1, see FIG. 4, the opening device 10 is caused to execute an outwardly directed, limited movement, i.e. a movement in the negative Z-direction, thereby moving the cover plate to said limited, open position, see FIG. 5.

The second opening device 11 includes a mechanical member, such as an arm 20, which with the cover-plate 1 in said limited open position is inserted behind the cover-plate 1 at the edge opposite to the edge along which the cover plate is hinged relative to the outer body panel, see FIG. 6. This is effected by moving the robot head in the X-direction.

The second opening device 11 is then caused to act on the rear side 13 of the cover-plate and to move laterally, such as to open the cover-plate completely, see FIGS. 7 and 8. This lateral movement is effected by moving the robot head in a coordinated movement in the X-Z-plane.

According to the method, the cover-plate 1 is closed by moving the second opening device 11 laterally with said device in abutment with the outside 14 of the cover-plate, such as to swing the plate from its open to its closed position, see FIGS. 9 and 10. This lateral movement is also effected by causing the robot head to execute a coordinated movement in the X-Z-plane.

Filling of the vehicle takes place subsequent to moving the cover-plate to the fully-open position illustrated in FIG. 8. As mentioned in the aforegoing, the robot head takes a predetermined position in relation to the transponder. The robot then measures its movements effected when the cover-plate is opened, such that the position of the robot relative to the vehicle chassis is always known. The transponder has stored therein relevant information concerning the position of the fuelling pipe relative to the position of the transponder. The transponder may also contain information concerning the precise movements to be carried out by the robot head in order to open the cover plate in the aforedescribed manner.

The transponder may also contain information as to whether the cover-plate is hinged on a vertical axis or a horizontal axis. The case where the cover-plate is hinged on a vertical axis is described above. When the cover-plate is hinged on a horizontal axis, a corresponding set of movements in the Y-Z-plane is carried out instead.

Beginning from the position illustrated in FIG. 8, the robot head moves in the negative Z-direction, whereafter the robot head is moved to the filling pipe. When refuelling of the vehicle is completed, the robot head is moved to the position shown in FIG. 9, therewith closing the cover-plate in the aforedescribed manner.

According to a first embodiment, the first opening device 10 includes one or more suction cups 21 which communicates/communicate with a subpressure source (not shown) through a hose 22. The suction cups are intended to abut the cover-plate in a region opposite the edge along which the cover-plate is hinged relative to the outer body panel, whereafter subpressure is applied prior to the opening device executing the outwardly directed, limited movement. FIG. 11 illustrates, by way of example, a suction cup arrangement seen in the direction of arrow 23 in FIG. 1. This suction cup arrangement includes nine suction cups 24 disposed in a diamond pattern. This construction ensures that a number of suction cups will always be in good contact with the outer surface 14 of the cover-plate 1.

According to a second embodiment, the first opening device 10 includes a permanent magnet or an electromagnet 25, see FIG. 12, which is intended to abut the cover-plate 1 in a region opposite to the edge along which the cover-plate is hinged relative to the outer body panel. When electric current flows in the electromagnet, or when a permanent magnet is used, the magnet is either intended to coact with the cover-plate 1, provided that said plate is constructed from magnetic material, or, alternatively, to coact with a magnetic member 26 attached to the rear side 13 of the cover-plate.

The first opening device may be provided with one or more springs 27 made of steel or rubber material, such that the opening device will be brought smoothly and gently into abutment with the cover-plate 1. The first opening device is also preferably pivotally suspended relative to the body 19, via a hinge 28, against the action of a spring force.

A very important feature of the present invention resides in the fact that the cover-plate is opened in two stages, wherein in the first stage cover-plates of different types can be opened by means of the afore-described first opening device, and wherein the second opening stage can also be effected with cover-plates of different designs.

The present invention can be modified with respect to its construction. For example, the two cover-plate opening devices may have a different construction to that shown, without departing from their functional operation. Among other things, the first opening device may include both an electromagnet and suction cups.

The present invention shall not therefore be considered restricted to the aforedescribed embodiments, since modifications and variations can be made within the scope of the following claims.

I claim:

1. An arrangement having first and second opening devices for opening and closing a cover-plate on an automotive vehicle having an outer body panel and a refuelling pipe including a mouth, said plate lying in the line of the vehicle outer body panel and capable of being swung between an open and a closed position about a generally vertical or a generally horizontal hinge axis and covering the space in which the mouth of the vehicle refuelling pipe is located, comprising:

a first opening means positioned to abut and to releasably engage an outer surface of the cover-plate for opening the cover-plate slightly to a limited open position in a first opening stage;

a second opening means for insertion between the cover-plate and the outer body panel with the cover-plate in its limited open position, wherein said second opening means opens the cover-plate completely in a second opening stage by effecting a lateral movement of the cover-plate about its hinge axis with said second opening device in abutment with a rear side of said cover-plate;

positioning means for positioning the first and second opening means adjacent to the cover-plate; and wherein the second opening means swings the cover-plate from its open to its closed position, by moving said second opening means laterally while in abutment with an outer surface of the cover-plate.

2. An arrangement according to claim 1, wherein the first opening means includes at least one suction cup which communicates with a subpressure source, said suction cup being operable for abutment with the outer surface of the cover-plate in a region thereon spaced from the hinge axis; and wherein the first opening means is operable to execute an outwardly directed, limited movement and thereby open the cover-plate to said limited open position.

3. An arrangement according to claim 1, wherein the first opening means includes a magnet to abut the outer surface of the cover-plate in a region spaced from the hinge axis; and wherein the magnet coacts with a magnetic material forming part of the cover-plate; and wherein the first opening means executes an outwardly directed, limited movement, to open the cover-plate to said limited open position.

4. An arrangement according to claim 1, wherein said second opening means includes a mechanical member for insertion behind the cover-plate while said plate is in its limited open position.

5. A method for opening and closing a cover-plate on an automotive vehicle having an outer body panel and a refuelling pipe including a mouth, said plate lying in the line of the vehicle outer body panel and capable of being swung between an open and a closed position about a generally vertical or a generally horizontal hinge axis and covering the space in which the mouth of the vehicle refueling pipe is located, wherein a first opening device is positioned relative to the cover-plate and wherein a second opening device is positioned to be inserted between the cover-plate and the outer body panel, comprising the steps of:

a) providing a first opening means that is arranged to abut and to releasably engage an outer surface of the cover-plate, and a second opening means that is arranged to be inserted between the cover-plate and an adjacent outer body panel of the vehicle;

b) positioning the first and second opening means externally of and adjacent to the cover-plate;

c) opening the cover-plate a limited distance to a first, limited open position with the first opening means to enable the second opening means to be inserted between the cover-plate and the adjacent portion of the vehicle outer body panel; and d) opening the cover-plate from the first, limited open position to a second, fully-open position with the second opening means.

6. A method in accordance with claim 5, including the step of providing at least one suction cup on the first opening means, wherein the at least one suction cup communicates with a subpressure source; bringing the at least one suction cup into abutment with the outer surface of the cover-plate in a region of the cover-plate spaced from the hinge axis; and effecting an outwardly directed, limited movement of the first opening means to open the cover-plate to said first, limited open position.

7. A method in accordance with claim 5, including the steps of:

providing a magnet on the first opening means;

bringing the magnet into abutment with the cover-plate in a region of the cover-plate spaced from the hinge axis to coact with a magnetic material carried by the cover-plate; and effecting an outwardly directed, limited movement of the first opening means to open the cover-plate to said first, limited open position.

8. A method in accordance with claim 5, including the steps of:

providing an arm member on the second opening means;

inserting the arm member behind the cover-plate at an edge spaced opposite from the hinge axis;

causing the second opening means to engage a rear side of the cover-plate; and moving the second opening device laterally relative to the cover-plate hinge axis to fully open the cover-plate.

9. A method in accordance with claim 5, including the step of:

closing the cover-plate by laterally moving the second opening means to swing the cover-plate from its fully open position to its closed position.

* * * * *